United States Patent [19]

Scott, Jr. et al.

[11] Patent Number: 4,984,938

[45] Date of Patent: Jan. 15, 1991

[54] COATED WASHER FOR AN ANCHOR BOLT SYSTEM

[75] Inventors: Ralph F. Scott, Jr., Coraopolis; Frank M. Locotos, Bridgeville, both of Pa.

[73] Assignees: H&S Machine & Supply Company, Inc., Coraopolis; F.M.Locotos Co., Inc., McMurray, both of Pa.

[21] Appl. No.: 414,184

[22] Filed: Sep. 28, 1989

Related U.S. Application Data

[63] Continuation of Ser. No. 236,517, Aug. 25, 1988.

[51] Int. Cl.$^5$ .......................................... E21D 20/02
[52] U.S. Cl. ........................................ 405/261; 405/260; 405/259; 411/534; 411/428; 411/903
[58] Field of Search ............ 405/259, 260, 261, 262; 411/534, 901, 902, 903, 428

[56] References Cited

U.S. PATENT DOCUMENTS

| | | | |
|---|---|---|---|
| 3,244,625 | 4/1966 | Silwones | 252/28 |
| 3,375,193 | 3/1968 | Ruzza et al. | 252/23 |
| 3,377,278 | 4/1968 | Ruzza et al. | 252/23 |
| 3,634,129 | 1/1972 | Benz | 117/119 |
| 3,914,178 | 10/1975 | Fineran et al. | 252/12 |
| 3,926,818 | 12/1975 | Albertson et al. | 252/12.4 |
| 3,962,103 | 6/1976 | Johnston et al. | 252/22 |
| 4,074,011 | 2/1978 | Teramae et al. | 428/422 |
| 4,097,257 | 6/1978 | Davey | 65/26 |
| 4,179,529 | 12/1979 | Vetter | 427/44 |
| 4,206,060 | 6/1980 | Yamamoto et al. | 252/22 |
| 4,354,948 | 10/1982 | Schoch et al. | 252/22 |
| 4,538,790 | 9/1985 | Williams et al. | 411/534 |
| 4,556,344 | 12/1985 | White | 405/261 |
| 4,564,315 | 1/1986 | Rozanc | 405/261 |
| 4,619,559 | 10/1986 | Norris | 405/259 |
| 4,746,248 | 5/1988 | Lillis et al. | 405/260 |

OTHER PUBLICATIONS

*MESA Information Report*, U.S. Department of the Interior, 1976.
ASTM Standard Specifications for Hardened Steel Washers, #F 436-86, 1988.
Proceedings of 1st Annual Conference on Ground Control Mining, Morgantown, W.V., Jul. 1981-(Maleki, et al.).
Proceedings of 4th Annual Conference on Ground Control Mining, Morgantown, W.V., Jul. 1985. (Mahyera et al.).

*Primary Examiner*—Dennis L. Taylor
*Assistant Examiner*—J. Russell McBee
*Attorney, Agent, or Firm*—Webb, Burden, Ziesenheim & Webb

[57] ABSTRACT

The anchor bolt assembly is of the tensionable type used in mine roofs and the like in which the anchor bolt assembly is positioned in a bore hole of a rock formation. The bolt assembly includes an elongated bolt shaft with a head at one end and is threaded on the other end and has a mechanical expansion anchor on the threaded end. A bearing having a central opening is positioned on the bolt to engage a face of the rock formation. A two faced graphite coated washer is positioned on the bolt between the bolt head and the bearing plate. During installation, the washer acts as an anti-friction bearing between the bolt head and the plate to improve the torque to tension relationship.

14 Claims, 1 Drawing Sheet

COATED WASHER FOR AN ANCHOR BOLT SYSTEM

This application is a continuation of application Ser. No. 07/236,517, filed Aug. 25, 1988.

BACKGROUND OF THE INVENTION

1. Field of the Invention

This invention relates to roof bolts and more particularly to a roof bolt which is positioned in a bore hole drilled in a rock formation in a mine roof and which is held in place within the bore by a tensionable roof bolt system.

2. Description of the Prior Art

It is well established practice in underground mining work, such as coal mining, tunnel excavation, or the like, to reinforce or support the roof of the mine to prevent rock falls or cave-ins. One of the presently used systems to support a mine roof is an elongated bolt or bar which is inserted into a pre-drilled hole in the rock formation above the mine roof and which is securely fixed in the hole by an anchoring means such as a mechanical anchor. Other types of tensionable mine roof bolt systems are also known in the art. More recently the use of quick setting resins have been used in conjunction with mechanical anchors or the other tensionable systems to further support the roof bolt in the bore hole.

The mechanical anchor is generally a radially expanding expansion shell and an internally threaded tapered nut or spreader. The downward movement of the expansion shell is limited by a support mechanism such as a nut or the like. Once this mechanical anchor type of roof bolt is set with or without the resin system, the bolt is further tensioned.

More specifically, the bolt head or a nut, a washer and a bearing plate represent the portion of the anchoring system external to the pre-drilled bore hole. The system is placed in tension by tightening the bolt head or nut causing the head or nut, the washer and the bearing surface to be placed in compression This in turn also causes the mine roof which is within close proximity of the bearing surface to be placed in compression and thus provides improved roof support. It is therefore desirable to maximize the induced tension from the applied torque.

It has been recognized that a friction reducing washer positioned between the nut or bolt head and the bearing plate reduces the effects of friction and improves the level of tension in a given bolt as well as reducing the variability in tensioning from bolt to bolt. Most commonly used is a hardened steel washer which is recognized in the present A.S.T.M. specifications. Two other types of washers for this purpose are disclosed in U.S. Pat. Nos. 4,619,559 and 4,746,248.

The hardened steel washer does improve bolt tension/torque ratio to a point, but greater increases are desirable. A problem also exists with the hardened steel washer in that as the bolt is tensioned, the nut and washer tend to spark creating a potentially dangerous situation when methane gas is present. Further, the washer is subject to rusting which increases friction and reduces its effectiveness. The plastic washer disclosed in U.S. Pat. No. 4,619,559 does not generally withstand the applied forces and tends to fail by either ripping or extruding between the bearing plate and bolt head. The lubricated washer disclosed in U.S. Pat. No. 4,746,248 requires the application of heat generated by tightening the bolt to be effective and is thus variable from bolt assembly to bolt assembly. In addition, the latent lubricating material tends to squeeze out from the assembly under high boom pressures and further tends to collect dirt and other impurities which adhere to hot melt adhesives of type employed It is, therefore, an object of the present invention to improve the mine bolt tension/torque relationship which is simple and inexpensive to implement.

It is yet another object of the present invention to improve the mine bolt tension/torque relationship which is not temperature dependent.

SUMMARY OF THE INVENTION

We have now developed a washer which provides an improved torque/tension relationship. The washer avoids sparking which prevents safety problems in gaseous mines. The active lubricating ingredient does not squeeze out under high boom pressure and equally reduces friction on both sides. Likewise the washer is rust proofed and not temperature dependent. Furthermore, the washer is easily manufactured through simple methods such as dip coating and is a one component system.

In one form the washer is coated with a graphite suspension, preferably in a resin based system, to a thickness of at least 0.5 mil per face at a solids content of 30% to 50%. A preferred solids range is 35% to 45% and a most preferred range is 35% to 40%. The coating thickness can be varied depending upon the particular application and rotational needs of the bolt to arrive at the desired tensions.

DESCRIPTION OF THE PREFERRED EMBODIMENT

Figure 1:
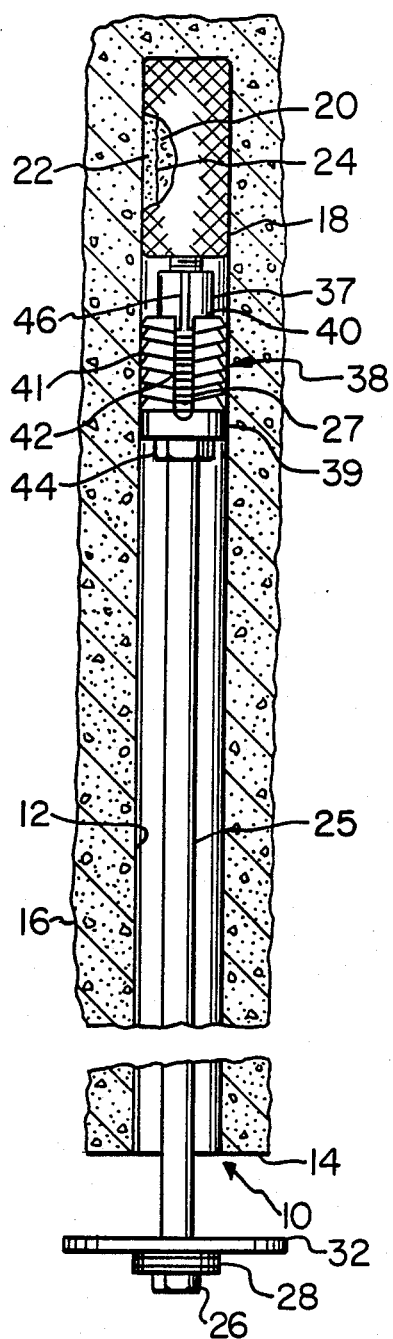
FIG. 1 is a side elevational view, partially in section, showing a rock formation having a bore hole with a roof bolt assembly according to the present invention.
Figure 2:
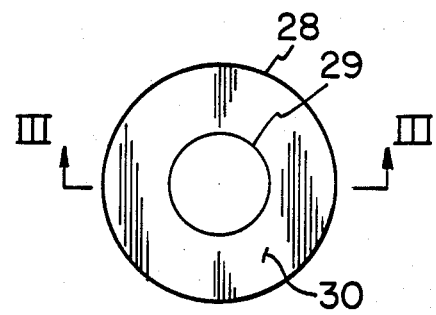
FIG. 2 is a top view of a graphite coated washer according to the present invention.
Figure 3:
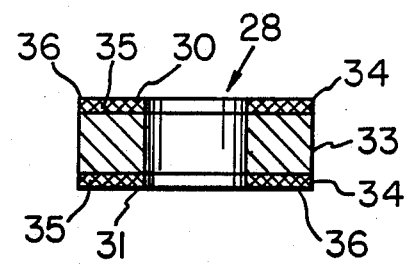
FIG. 3 is a section on line III—III.

Referring now to FIGS. 1 to 3 there is shown a roof bolt assembly, generally designated 10, in accordance with the present invention. The roof bolt 10 is an elongated member often reaching lengths of three to eight feet or longer. The roof bolt 10 is positioned within a bore hole 12 which is drilled upwardly through a generally horizontal mine roof surface 14 and into the rock formation 16 above the mine entry.

A quick-setting resin cartridge 18 is positioned in the blind or upward end of the bore hole 12. The resin cartridge 18 is basically an enclosed, elongated tube which includes two components, an active agent 20 and a reaction agent 22 of a resin grouting mix, separated by a membrane 24. The active agent of a commonly available resin cartridge includes a polyester resin as the major component. The reaction agent is typically a catalyst or curing or hardening agent. The two components 20, 22 of the resin cartridge 18 remain in a semi-liquid or thixotropic phase until mixed, whereupon the resin begins to quickly solidify. Curing and solidification continue until an extremely strong bond is formed by the resin grout. Although it is preferred to use a quick-setting resin in conjunction with the mine roof bolt 10, the present invention will also give excellent results without the resin grout.

The roof bolt assembly 10 includes an elongated bolt shaft 25 with a head 26 on one end and with threads 27 at the other end. A circular graphite coated washer 28 having an upper face 30, a lower face 31 and a hole 29 therethrough slidably receives the bolt shaft 25. An apertured bearing plate 32 is also received on the bolt shaft 25 and sandwiches the washer 28 with the head 26 of the bolt shaft 25. Furthermore, the outer diameter of the head 26 of the bolt shaft 25 is smaller than the outer diameter of the washer 28, which, in turn, is smaller than the outer diameter of the bearing plate 32. The washer 28 has preferably a hardened steel inner core 33 and an outer coating 34 comprised of a graphite suspension 35 mixed with a resinous base or binder 36 as shown in FIG. 3. Preferably the coating should be at least 0.0005" thick per face. The graphite coating is not temperature dependent over the temperature ranges in which the bolt assembly 10 is implemented. One particular graphite mixture that was found to work exceptionally well in this particular application is Grafo 231-5, manufactured by Grafo Colloid Corporation, Sharon, Pennsylvanie 16146, which has been about 37.5% suspended solids. The washer 28 (preferably a hardened steel washer) is first dipped in a vat containing Grafo 231-5 and then air dried, resulting in a coating thickness of about 0.0005" to 0.001" per face. The above described process can be repeated if a thicker graphite coating is required. It is believed ranges varying from 30%-50%, preferably 35%-45% and most preferably 35%-40% of suspended solids will achieve excellent results. It is believed that increased graphite solid content increases film thickness and prolongs lubricity. It is also possible to spray the graphite coating onto the washer 28. In that case, a graphite coating having less than 30% solids may be required so that a fine mist spray can be produced as is well known to one skilled in the art and, accordingly, several applications may be required to get the proper coating thickness. It is also believed that other non-temperature dependent solid or dry lubricants will also work in this application, such as molybdenum disulfide. Further, solid lubricants, such as graphite, suspended in a water base solution have achieved improved torque/tension relationships.

An expansion anchor comprising a tapered nut or spreader 37 having therein an internally threaded axial bore, and an expansion shell or gripping member 38 is carried on the threaded end 27 of the bolt shaft 25. The gripping member 38 is formed with a circular collar 39 at its base and with a plurality of radially expandable gripping fingers 40 extending integrally therefrom. Each gripping finger 40 is provided on its external surface with some type of gripping or engagement mechanism such as the plurality of gripping teeth 41 as shown. The gripping fingers 40 are preferably spaced apart from one another by a narrow vertical slot 42. Downward movement of the gripping member 38 is prevented by a support mechanism 44 affixed to the bolt shaft 25 at the bottom of the threads 27 by crimping or by other means as is known in the art. The spreader 37 has a downwardly tapered configuration with an enlarged upper end and a smaller lower end. A portion of the inner surface of each gripping finger 40 abuts the tapered outer surface of the spreader 37. An elongated key 46 on the outer surface of the spreader 37 and integral therewith is positioned within a vertical slot 42 between an adjacent pair of gripping fingers 40 and helps to keep the gripping member 38 from rotating along with the spreader 37 when the bolt shaft 25 is rotated.

The operation of the roof bolt assembly 10 in accordance with the present invention can be explained with reference to FIG. 1. Initially a resin cartridge 18 is placed in the bore hole 12 above the roof bolt 10 and the roof bolt 10 is advanced upwardly into the bore hole 12. FIG. 1 shows the arrangement just prior to the rupture of the resin cartridge 18. The roof bolt 10 then continues to advance into the bore hole 12 and ruptures the resin cartridge 18. At the same time, the components 20, 22 of the ruptured resin cartridge 18 are forced downward from the upward displacement of the anchor assembly.

The bolt head 26 and, hence, the entire bolt shaft 25, is rotated continuously in one direction and is drawn upward until the bearing plate 32 comes into contact with the mine roof surface 14.

Continued rotation of the bolt head 26 will then cause the spreader 37 to move downwardly along the threads 27. This downward movement of the spreader 37 causes the gripping fingers 40 to expand radially outward and force the gripping teeth 41 into a secure engagement with the rock formation 16 surrounding the bore hole 12. Rotation of the roof bolt 10 is continued without interruption until the support mechanism 44 fails and the proper tensioning force is reached. The graphite outer coating 34 of the washer 28 reduces the frictional force losses between the bolt head 26 and bearing plate 32 so that a greater amount of rotational force can be converted into bolt tension than has been possible before.

Hardened washers coated with a 37.5% graphite resin system had a tension/torque ratio of up to 92:1 which compares favorably with an uncoated hardened washer which typically has a tension/torque ratio on the order of 50:1.

Because washers coated with the solid lubricant suspension system minimize sparking, such washers may also be used in non-tensioning bolting systems where gas buildup in the mine is a problem.

Additionally, since the graphite coating is not temperature sensitive, the graphite coated washer can be placed directly on a hot forged mine bolt without affecting its lubricity while, on the other hand, the lubricity of the washers disclosed in U.S. Pat. Nos. 4,619,559 and 4,746,248 would be adversely affected since they would melt at such temperature.

Having described the presently preferred embodiment of the invention, it is to be understood that it may be otherwise embodied within the scope of the appended claims.

I claim:

1. In an anchor bolt assembly for insertion into a pre-drilled hole of a rock formation within a mine and comprising an elongated roof bolt having a head at one end external of the hole, a bearing plate having a central opening and positioned on said bolt to engage a face of said rock formation and a two-faced hardened steel washer positioned on said bolt between said bolt head and said bearing plate, the improvement comprising a coating formed of a dry graphite lubricant suspension on both faces of said washer, wherein said anchor bolt assembly being tensioned and the washer acting to reduce friction between said bolt head and said plate to improve the torque-tension relationship.

2. The anchor bolt assembly as defined in claim 1 wherein said graphite coating is at least 0.0005" thick per face.

3. The anchor bolt assembly as defined in claim 1 wherein said coating comprises a graphite suspension in a resin based system.

4. The anchor bolt assembly as defined in claim 1 wherein said graphite coating comprises a graphite suspension in a resin base having about 30%–50% suspended solids.

5. The anchor bolt assembly as defined in claim 4 wherein said graphite coating comprises a graphite suspension in a resin base having about 35%–45% suspended solids.

6. The anchor bolt assembly as defined in claim 5 wherein said coating is at least 0.0005" thick per face.

7. The anchor bolt assembly as defined in claim 4 wherein said graphite coating comprises a graphite suspension in a resin base having about 35%–40% suspended solids.

8. The anchor bolt assembly as defined in claim 4 wherein said graphite coating comprises a graphite suspension in a resin base having about 37.5% suspended solids.

9. In a method of reinforcing a rock formation in a maine having a pre-drilled bore hole with at least one anchor bolt assembly, said anchor bolt assembly comprising an elongated roof bolt having a head at one end, a bearing plate having a central opening and positioned on said bolt to engage a face of said rock formation and a two-faced hardened steel washer positioned on said bolt between said bolt head and said bearing plate, comprising:
  A. advancing said roof bolt into the bore hole; and
  B. rotating said bolt head in one direction until said bearing plate comes into contact with said face of said rock formation and places said bolt in tension;
  the improvement comprising: reducing the coefficient of friction between said bearing plate, said washer, and said bolt head by coating both faces of said washer with a dry graphite lubricant suspension.

10. The method of claim 9, further comprising applying said graphite coating in a thickness of at least 0.0005" inches thick per face.

11. The method of claim 9, wherein said coating comprises a graphite suspension in a resin based system.

12. The method of claim 9, wherein said graphite coating comprises a graphite suspension in a resin base having about 30%–50% suspended solids.

13. The method of claim 9, wherein said graphite coating comprises a graphite suspension in a resin base having about 37.5% suspended solids.

14. In a method of reinforcing a rock formation in a mine having a pre-drilled bore hole with at least one anchor bolt assembly, said anchor bolt assembly comprising an elongated roof bolt having a threaded first end with an expansion anchor carried on said threads, a support mechanism affixed to said bolt shaft at a bottom of said threads, a head at a second end, a bearing plate having a central opening and positioned on said bolt to engage a face of said rock formation and a two-faced hardened steel washer positioned on said bolt between said bolt head and said bearing plate, comprising:
  A. advancing said roof bolt and expansion member into the bore hole;
  B. rotating said bolt head in one direction until said bearing plate comes into contact with said face of said rock formation; and
  C. continuing rotating said bolt head until said expansion anchor causes said support mechanism to fail, whereby placing said bolt in tension;
  the improvement comprising: reducing the coefficient of friction between said bearing plate, said washer, and said bolt head by coating both faces of said washer with a dry graphite lubricant suspension.

* * * * *

UNITED STATES PATENT AND TRADEMARK OFFICE
CERTIFICATE OF CORRECTION

PATENT NO. : 4,984,938

DATED : January 15, 1991

INVENTOR(S) : Ralph F. Scott, Jr. and Frank M. Locotos

It is certified that error appears in the above-identified patent and that said Letters Patent is hereby corrected as shown below:

Column 1 Line 42 after "compression" insert --.--.

Column 2 Line 7 after "employed" insert --.--.

Column 3 Line 22 "Pennsylvanie" should read --Pennsylvania--.

Claim 9 Line 26 Column 5 "maine" should read --mine--.

Claim 10 Line 6 Column 6 "0.0005" inches" should read --0.0005 inches--.

Signed and Sealed this

Second Day of June, 1992

Attest:

DOUGLAS B. COMER

Attesting Officer

Acting Commissioner of Patents and Trademarks